United States Patent

Beckmann et al.

[11] Patent Number: 5,753,775
[45] Date of Patent: May 19, 1998

[54] SULFONATED AND OXIDIZED INDENE POLYMERS

[75] Inventors: Eberhard Beckmann, Neustadt; Stefan Erren, Kallstadt; Ulf Baus, Dossenheim; Norbert Zimmermann, Waldsee; Erich Kromm, Weisenheim; Klaus Taeger, Freinsheim; Eva-Marie Borschel; Willi Bury, both of Ludwigshafen, all of Germany

[73] Assignee: BASF Aktiengesellschaft, Ludwigshafen, Germany

[21] Appl. No.: 586,823

[22] PCT Filed: Jul. 6, 1994

[86] PCT No.: PCT/EP94/02207

§ 371 Date: Jan. 31, 1996

§ 102(e) Date: Jan. 31, 1996

[87] PCT Pub. No.: WO95/04088

PCT Pub. Date: Feb. 9, 1995

[30] Foreign Application Priority Data

Jul. 31, 1993 [DE] Germany .................... 43 25 752.6

[51] Int. Cl.⁶ .................... C08F 8/36; C08F 8/06
[52] U.S. Cl. .................... 525/327.9; 525/344; 525/388
[58] Field of Search .................... 525/327.9, 332.1

[56] References Cited

U.S. PATENT DOCUMENTS 2,206,589  7/1940  Wayne .................... 525/327.9
4,071,493  1/1978  Begou .

FOREIGN PATENT DOCUMENTS 40 18 873   12/1991   Germany .
2-225355    9/1990    Japan .

*Primary Examiner*—Christopher Henderson
*Attorney, Agent, or Firm*—Oblon, Spivak, McClelland, Maier & Neustadt, P.C.

[57] ABSTRACT

Sulfonated and oxidized indene polymers obtainable by
(a) polymerization of indene or indene derivatives of the general formula I

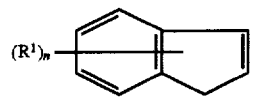

where $R^1$ is hydrogen, methyl or ethyl and n is 1 or 2, or of mixtures which contain the compounds I as well as other copolymerizable and/or non-polymerizable organic compounds in an amount of at least 10% by weight.
b) sulfonation of the polymer with a sulfonating agent at from 40° to 130° C., and
c) non-chain-degrading oxidation of the polymer at from 80° to 180° C.

These indene polymers are suitable for use as dispersants for example in dye and pigment preparations.

3 Claims, No Drawings

SULFONATED AND OXIDIZED INDENE POLYMERS

BACKGROUND OF THE INVENTION

1. Field of the Invention

The present invention relates to novel indene polymers which are obtainable by polymerization of indene or indene derivatives, subsequent sulfonation and non-chain-degrading oxidation at elevated temperatures and to the use thereof as novel dispersant in a wide range of technical fields. The present invention further relates to dye and pigment preparations including these indene polymers as dispersants.

2. Description of the Related Art

DE-A-2 659 375 (1) discloses alkali metal salts of sulfonated styrene-indene hydrocarbon resins obtainable by sulfonation of the starting styrene-indene-carbon resins with for example oleum in solution at temperatures up to 65° C. They are suitable for use as superplasticizers for mineral pastes and binders, in particular for concrete.

JP-A-90/225 355 (2) recommends for use as additives for cement distillatively purified and polymerized thermal decomposition residue oils from petroleum fractions containing indenes and styrenes after sulfonation at low temperatures and neutralization.

Dye preparations or dyebaths customarily contain dispersing agents comprising ligninsulfonates, sulfonates of phenol-formaldehyde condensates or naphthalenesulfonic acid-formaldehyde condensates. The agents have a number of application disadvantages with, in particular, the amount required being too high, the dispersion stability being too low and the dyeing obtained being too weak or too unlevel. After their use as dispersants the products mentioned pass into the waste water whence they are biodegradable or bioeliminable in water treatment plants only to a small extent.

SUMMARY OF THE INVENTION

It is an object of the present invention to provide dispersants for various industrial purposes, in particular for dye preparations and dyebaths, which, compared with existing dispersants, are appreciably eliminable or degradable and also have better application properties.

We have found that this object is achieved by sulfonated and oxidized indene polymers obtainable by (a) polymerization of indene or indene derivatives of the general formula I

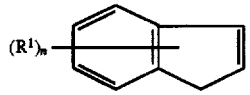

where $R^1$ is hydrogen, methyl or ethyl and n is 1 or 2, or of mixtures which contain the compounds I as well as other copolymerizable and/or non-polymerizable organic compounds in an amount of at least 10% by weight, (b) sulfonation of the polymer with a sulfonating agent at from 40° to 130° C., and (c) non-chain-degrading oxidation of the polymer at from 80° to 180° C.

$R^1$ in the formula I is preferably hydrogen or methyl, and n is preferably 1. Examples of suitable monomethylindenes are 2-, 3-, 4-, 5-, 6- and 7-methylindene.

DESCRIPTION OF THE PREFERRED EMBODIMENTS

The polymerization in step (a) is normally catalyzed by protic acids, for example sulfuric acid, or by Lewis acids, for example boron trifluoride, and it therefore generally proceeds according to ionic mechanisms. If, in the present system, all three steps (a), (b) and (c) are to be carried out in a single reaction vessel without intermediate isolation steps, i.e. as a one-pot process, it is particularly advantageous to catalyze the polymerization (a) with a small amount of the acidic sulfonating agent, preferably sulfuric acid or oleum, required later for (b). However, the polymerization can also be carried out as a continuous process in which the compounds to be polymerized and the acidic sulfonating agent are metered simultaneously into, for example, a stirred kettle cascade or a tubular reactor.

The degree of polymerization should not be too high if good application properties are to be achieved and should range from about 2 to 50, preferably from 3 to 10.

Suitable sulfonating agents for step (b) include in principle all customary agents such as chlorosulfonic acid, chlorohydrin-sulfuric acid or sulfuryl chloride. However, of particular advantage are sulfuric acid, preferably concentrated sulfuric acid, and oleum, which can have an $SO_3$ content of up to about 90% by weight. The best results are achieved with from about 50 to 70% strength by weight oleum. The sulfonation is carried out in a conventional manner by advantageously adding the desired amount of sulfonating agent, in the present case preferably from 0.3 to 1.7 mol, in particular from 0.5 to 1.3 mol, of calculated $SO_3$ per mole of I and removing heat as necessary, since the reaction is exothermic. The most suitable sulfonating temperature ranges from about 45° to 120° C., in particular from 50° to 100° C., depending whether or not a solvent or diluent is employed.

The oxidation step (c) can in principle be carried out with any oxidizing agent suitable for oxidizing benzylic or allylic C—H bonds, e.g. air or oxygen in the presence of a catalyst, as a separately adjoining stage. However, in the present system it is particularly favorable for the oxidizing agent used to be the same agent, preferably sulfuric acid or oleum, as used for the sulfonation (b) and for the change from step (b) to step (c) to be made by raising the temperature gradually to 180° C., preferably to not higher than 180° C., preferably to not higher than 165° C. The non-chain-degrading oxidation does not set in to any significant degree until the temperature reaches 90° C., especially 110° C. If a sulfonating agent is used as oxidizing agent, it is generally customary to use from 0.3 to 1.7 mol, in particular from 0.5 to 1.3 mol, of calculated $SO_3$ per mole of I.

The indene polymers of the invention thus contain not only sulfonic acid groups on the benzene nucleus but most probably also some carbonyl and/or carboxyl groups attached to the intact polymer or oligomer chain. Possible structure elements of these polymers may include:

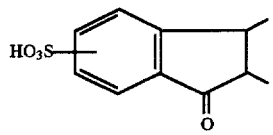

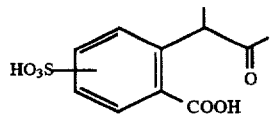

-continued

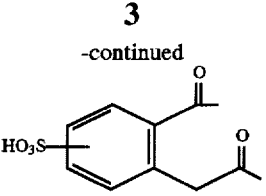

If sulfuric acid or oleum is used as oxidizing agent, analysis of the SO$_2$ formed in molar ratios as offgas from the reaction shows that from about 10 to 70 mol %, preferably from 15 to 55 mol %, of carbonyl and/or carboxyl groups, based on I, are formed.

A preferred embodiment are sulfonated and oxidized indene polymers obtainable by copolymerization of indene or indene derivatives I with styrene or styrene derivatives of the general formula II

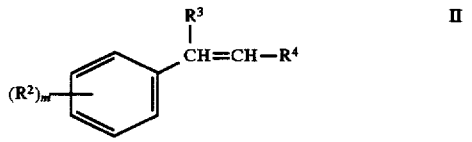

where R$^2$, R$^3$ and R$^4$ are each hydrogen, methyl or ethyl and m is 1 or 2, in a weight ratio of I:II from 1:9 to 50:1 in step (a).

R$^2$ to R$^4$ are each preferably hydrogen or methyl and m is preferably 1. When R$^2$ is methyl or ethyl and m is 1, the substitution pattern on the phenyl nucleus is ortho, meta or preferably para. When R$^2$ is methyl or ethyl and m is 2, the substitution pattern on the phenyl nucleus is preferably 2,4. Typical representatives of the compounds II are styrene, α-methylstyrene, β-methylstyrene and also o-, m- and p-vinyltoluene.

The monomers I, or the mixtures of the monomers I and II, can also be present in mixtures with other, usually liquid, non-polymerizable organic compounds, in which case, however, the I content of these mixtures should be at least 10% by weight. A particularly advantageous I content of these mixtures is from about 15 to 50% by weight.

These further usually liquid organic compounds have an advantageous effect as solvent or diluents in the preparation of indene polymers of the invention. It is possible to use for this purpose on the one hand inert organic solvents, for example hydrocarbons, chlorohydrocarbons or nitro hydrocarbons such as toluene, xylenes, mesitylene, carbon tetrachloride, tetrachloroethane, dichloroethane, chlorobenzene, dichlorobenzenes or nitrobenzene or higher boiling carboxylic esters such as methyl or ethyl benzoate, especially when the monomers I and, if used, II are used in pure form. On the other hand, it is also possible to use technical grade mixtures, in particular from tar production or from the petroleum industry, which contain the monomers I with or without II.

Accordingly, preference is given to sulfonated and oxidized indene polymers obtainable by using in step (a) the C$_9$ cut obtainable in the fractional distillation of the products of the thermal cracking of a naphthenic residue oil, this C$_9$ cut containing as polymerizable monomers from 10 to 50% by weight, preferably from 15 to 40% by weight, of compounds I and from 10 to 60% by weight, preferably from 20 to 40% by weight, of compounds II.

Such naphthenic residue oils are obtained for example in the cracking of light naphtha. They are also referred to as high boiling aromatic hydrocarbon oils. The naphthenic residue oil is customarily thermally cracked at temperatures from 1400° to 1700° C. The products are then carried off to a fractional distillation. The fraction which contains the main proportion of compounds having 9-carbon atoms is collected and used for producing the indene polymers of the invention.

A typical C$_9$ cut includes the following main components [in % by weight]:

| | |
|---|---|
| Indene | 10–30 |
| Methylindenes | 5–30 |
| Styrene | 5–10 |
| α-Methylstyrene | 1–4 |
| β-Methylstyrene | 2–6 |
| Vinyltoluenes | 10–25 |
| Xylenes | 3–6 |
| Methylethylbenzenes | 5–9 |
| Trimethylbenzenes | 5–9 |
| Diethylbenzenes | 2–6 |
| Indan | 1–4 |
| Naphthalene | 5–8 |
| further C$_{10}$- and C$_{11}$-hydrocarbons | 8–13 |

This C$_9$ cut contains from about 45 to 60% by weight, in particular from 50 to 55% by weight, of copolymerizable monomers, while the proportion of compounds I preferably ranges from about 20 to 35% by weight. The remainder consists essentially of aromatic hydrocarbons which are responsible for the diluting effect. They are to some extent cosulfonated in step (b) and, if left in the end product, may in certain circumstances improve the dispersant properties.

The non-polymerizable components in the C$_9$ cut or added organic solvents, having acted as diluents in the polymerization (a) and/or the sulfonation (b), can also be separated off by distillation or—if they were colsulfonated—by ultrafiltration or membrane filtration. Carboxylic esters can also be removed by hydrolysis with or without distillative removal of the hydrolysis products.

It is possible to isolate the indenes I from the C$_9$ cut, for example by means of the cyclopentadiene adducts, in pure form and convert them in that form into the polymers of the invention.

Styrene-indene hydrocarbon resins are also commercially available and are therefore likewise suitable for use as starting materials for the polymers of the invention.

One way of slightly modifying the indene polymers of the invention is to react the polymer, before or preferably after the oxidation (c), additionally with up to 30% by weight, preferably up to 15% by weight, of formaldehyde (calculated on 100% strength). It is customary to use for this purpose an aqueous formaldehyde solution from 10 to 50% strength by weight. The condensation reaction which occurs is advantageously carried out at a slightly elevated temperature, say at from 70° to 110° C.

Following the oxidation (c) it is advantageous, having regard to applications in an aqueous medium, for organic, water-immiscible or only slightly water-miscible solvent/diluent to be separated off as described above and if desired for the product to be neutralized and diluted with water as usual.

It is known from DE-A-4 018 873 that the presence of aromatic or long-chain aliphatic carboxylic acids or their salts or anhydrides has a favorable effect on the bioeliminability or biodegradability of dispersants. It may therefore be possibly advisable to add such a carboxylic acid, for example benzoic acid, to the starting material, for example to the C$_9$ cut, in the preparation of the indene polymers of the invention. If the benzoic ester is used as solvent and hydrolyzed after the reaction has ended, it is for the same reason advisable to leave the resulting benzoic acid or its salts in the product.

The present invention also provides a process for preparing sulfonated and oxidized indene polymers by
(a) polymerization of indene or indene derivatives of the general formula I

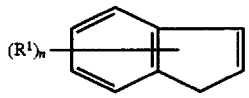

where $R^1$ is hydrogen, methyl or ethyl and n is 1 or 2, or of mixtures which contain the compounds I as well as other copolymerizable and/or non-polymerizable organic compounds in an amount of at least 10% by weight, and
(b) sulfonation of the polymer with a sulfonating agent at from 40° to 130° C.,
which comprises subsequently
(c) subjecting the polymer to a non-chain-degrading oxidation at from 80° to 180° C.

The sulfonated and oxidized indene polymers of the invention are readily soluble in water and are highly suitable for use as dispersants in dye and pigment preparations and also as dispersants in dyebaths for the dyeing of textiles.

Dyes which are formulated in water using dispersants are the dyes which are only sparingly soluble or insoluble in water, for example vat dyes, disperse dyes and only sparingly water-soluble or water-insoluble optical brighteners. Disperse dyes include for example water-insoluble or only sparingly water-soluble azo dyes, dyes of the series of the quinophthalones and their water-insoluble derivatives, anthraquinone dyes and dyes of other classes of compounds which are sparingly soluble or insoluble in water and which are applied to synthetic fiber material such as linear polyesters from an aqueous bath.

When used in dye preparations, the dispersants of the invention are used in amounts, based on 100 parts by weight of dye, of from 5 to 500, preferably from 25 to 400, parts by weight. When used as dyeing assistants in dyebaths for the dyeing of textiles, the dispersants of the invention are customarily used in amounts from 0.5 to 5 g/l, based on the dyebath.

The dye preparations thus obtainable have a long storage life, permit satisfactory level package dyeings without dye deposits, lead in particular in the case of vat dyeings to a deep and uniform appearance, and are appreciably degradable or at least eliminable.

In particular, however, the dispersants of the invention result in dye and pigment preparations of high dispersion stability and make it possible to achieve excellent dispersion at significantly lower quantities used than the prior art dispersants.

For instance, the dispersants of the invention exhibit, compared with a conventional naphthalenesulfonic acid-formaldehyde condensate, approximately twice as high a dispersion stability and need only be used in about half to ⅔ of the amount to achieve comparable results.

The dispersants of the invention may additionally have added to them customary assistants in an amount of up to 5% by weight, for example other dispersants, surfactants, antifoams, hydrotropes, standardizing agents, complexing agents or biocides.

The dispersants of the invention can also be used with good results in pigment preparations. Such pigment preparations can then be used for example for coloring wallpapers, paper compositions, crop protection agents, building materials, detergents or artist's colors.

The dispersants of the invention are also highly suitable for use in tannery formulations, i.e. as assistants in the making of leather and furs, for example as dispersant in the coloring of leather and furs or as a tanning agent in the retanning of leather and furs.

The dispersants of the invention can also be used with excellent success in plastics production, for example as dispersants or emulsifiers in latex making, preferably by emulsion polymerization, and in the production of paraffin dispersions.

The dispersants of the invention can also be used with good results in crop protection formulations. Examples are the use as dispersants or emulsifiers in powder or liquid formulations of herbicides, fungicides or insecticides.

In fertilizer formulations the dispersants of the invention are advantageously suitable for use as anticaking agents.

In the building industry the dispersants of the invention can be used with advantage as superplasticizers for cement, concrete and gypsum formulations or as spraying aids, for example for grouts.

In the treatment of water, for example in the treatment of boiler water, papermaking and metal treatment, for example in coolant and lubricant formulations, the dispersants of the invention likewise perform excellently.

The present invention further provides dye and pigment preparations themselves which include as dispersants from 5 to 500 parts by weight, preferably from 25 to 400 parts by weight, based on 100 parts by weight of dye or pigment, of the sulfonated and oxidized indene polymers of the invention.

EXAMPLES

Preparation examples

Example 1

116 g (1.0 mol) of pure indene were introduced into a kneader and heated to 60° C. Then 85.5 g (corresponding to 1.0 mol of total $SO_3$) of 65% strength by weight oleum were added dropwise. At a reaction temperature of 80° C. the addition of oleum was briefly interrupted and the mixture was cooled down to 65° C. Then the addition of oleum was continued and the internal temperature slowly raised to 120° C. in order that the increasingly viscous reaction mixture may remain kneadable. On completion of the addition of oleum the temperature was raised to 150° C. and further kneading was continued for 5 hours. Finally, and while the kneader was still running, the temperature was lowered to room temperature and the brown pulverulent product was discharged. 200 g of solid product were obtained. The $SO_2$ collected as sulfite in a wash bottle amounted to 0.45 mol.

Example 2

232.4 g (2.0 mol) of pure indene and 130 g of methyl benzoate were introduced into a stirred apparatus and heated to 50° C. Then 171 g (corresponding to 2.0 mol of total $SO_3$) of the 65% strength by weight oleum were added dropwise at from 60° to 65° C. over 4 hours. The reaction was initially strongly exothermic, so that the addition of oleum had to be temporarily interrupted while the reaction temperature was briefly as high as about 110° C. On completion of the addition of oleum the batch was stirred at 60° C. for 4 hours and then at 135° C. for 5 hours. The viscous mass was cooled down to 120° C. 800 g of water were stirred in, followed by 191 g (corresponding to 2.39 mol of NaOH) of 50% strength by weight sodium hydroxide solution. The temperature was raised to 90° C. and stirring was continued for 1 hour. After cooling down to room temperature pH 8–9 was set with about 10 g of 20% strength by weight sulfuric acid. 1430 g were obtained of a 32.5% strength by weight solution. The SO$_2$ collected as sulfite in a wash bottle amounted to 0.68 mol.

Example 3

256.4 g of a C$_9$ cut from the fractional distillation of the products of the thermal cracking of a naphthenic residue oil of the composition [in % by weight]

| | |
|---|---|
| C$_3$–C$_9$-Nonaromatics | 0.43 |
| Benzene | <0.01 |
| Toluene | 0.06 |
| Ethylbenzene | 0.66 |
| p-Xylene | 0.51 |
| m-Xylene | 1.98 |
| o-Xylene | 2.08 |
| Styrene | 7.63 |
| Isopropylbenzene | 0.08 |
| n-Propylbenzene | 0.87 |
| 1-Methyl-2-ethylbenzene | 1.45 |
| 1-Methyl-3-ethylbenzene | 4.17 |
| 1-Methyl-4-ethylbenzene | 1.13 |
| 1,2,3-Trimethylbenzene | 1.68 |
| 1,3,5-Trimethylbenzene | 1.43 |
| 1,2,4-Trimethylbenzene | 3.86 |
| α-Methylstyrene | 2.07 |
| Indan | 2.27 |
| β-Methylstyrene | 3.56 |
| Vinyltoluenes | 16.25 |
| Indene | 17.92 |
| further C$_9$-aromatics | 1.39 |
| 1,3-Dimethyl-5-ethylbenzene | 1.18 |
| 1,2-Diethylbenzene | 0.65 |
| 1,3-Diethylbenzene | 0.50 |
| 1,4-Diethylbenzene | 2.67 |
| Dicyclopentadiene | <0.01 |
| Naphthalene | 6.11 |
| Methylindenes | 6.11 |
| α-Methylnaphthalene | 0.10 |
| β-Methylnaphthalene | 0.18 |
| further C$_{10}$–C$_{11}$-hydrocarbons | 10.88 |
| Total | 100.00 |
| Total polymerizable monomers | 53.68 |
| and a density at 15° C. of | 0.929g/ml | and also 48.8 g (0.4 mol) of benzoic acid were introduced into a stirred apparatus and heated to 60° C. Then 217.2 g (corresponding to 2.54 mol of total SO$_3$) of 65% strength by weight oleum were added dropwise at 60°–65° C. for 4 hours. Because of the initially strong exothermic reaction the reaction temperature rose briefly to 95° C., so that the addition of oleum had to be temporarily interrupted. On completion of the addition of oleum the batch was stirred at 60° C. for 4 hours and then at 135° C. for 5 hours. Thereafter the viscous mass was cooled down to about 100° C. 300 g of water were stirred in. 400 g of the resulting solution were further processed as Example 4; the remainder was diluted with further water to a solids content of about 50% by weight and adjusted with 89 g (corresponding to 1.12 mol of NaOH) of 50% strength by weight sodium hydroxide solution to a pH of 7–8. 510 g were obtained of an approximately 50% by weight solution. The SO$_2$ collected as sulfite in a wash bottle amounted to 0.53 mol.

Example 4

400 g of the product solution of Example 3 were introduced into a stirred apparatus and admixed with 50 g (corresponding to 0.5 mol of CH$_2$O) of a 30% strength by weight aqueous formaldehyde solution. The batch was then stirred at 100° C. for 8 hours. Then it was diluted with 500 g of water and adjusted with 102 g (corresponding to 1.28 mol of NaOH) of 50% strength by weight sodium hydroxide solution to a pH of 10.5. Thereafter stirring was continued at 90° C. for 1 hour, after which the batch was cooled down to room temperature and adjusted with about 8 g of 20% strength by weight sulfuric acid to pH 8–9. 965 g were obtained of a 23% strength by weight solution.

Example 5

116 g of a commercial styrene-indene hydrocarbon resin of softening point 85° C. (Norsolen® S85 from Cray Valley) and 67 g of methyl benzoate were introduced into a stirred apparatus and heated to 60° C. Then 85.5 g (corresponding to 1.0 mol of total SO$_3$) of 65% strength by weight oleum were added dropwise at 60°–65° C. over 4 hours. The reaction was initially so strongly exothermic that the addition of oleum had to be temporarily interrupted while the temperature rose briefly to 80° C. On completion of the addition of oleum the batch was stirred at 60° C. for 4 hours and at 135° C. for 5 hours. The viscous mass was cooled down to 120° C., diluted with 500 g of water and admixed with 124 g (corresponding to 1.55 mol of NaOH) of 50% strength by weight sodium hydroxide solution. The batch was subsequently stirred at 90° C. for 1 hour, cooled down to room temperature and adjusted with about 24 g of a 20% strength by weight sulfuric acid to pH 7–8. 890 g were obtained of a 32% strength by weight solution. The SO$_2$ collected as sulfite in a wash bottle amounted to 0.16 mol.

Example 6

58.1 g (0.5 mol) of pure indene and 52.0 g (0.5 mol) of pure styrene were polymerized in the 65 g of methyl benzoate analogously to Example 2 and then reacted with 85.5 g (corresponding to 1.0 mol of total SO$_3$) of 65% strength by weight oleum analogously to Example 2. Into the resulting viscous reaction mixture was stirred, at 120° C., 400 g of water, followed by 75 g (corresponding to 0.94 mol of NaOH) of 50% strength by weight sodium hydroxide solution. The rest of the working up was carried out analogously to Example 2. 690 g were obtained of a 32.5% strength by weight solution. The SO$_2$ collected as sulfite in a wash bottle amounted to 0.27 mol.

Example 7

250 g of the C$_9$ cut of Example 3 were introduced into a stirred apparatus and heated to 45° C. Then about 3 g of 65% strength by weight oleum were added dropwise, and a strongly exothermic reaction started. The temperature rose to 90° C. After cooling down to 65° C. the non-polymerizable volatiles were distilled off under a water pump vacuum. Then a further 82.5 g (corresponding together to 1.0 mol of total SO$_3$) of 65% strength by weight oleum were added dropwise. The reaction continued to be exothermic and the viscosity increased continuously. The internal temperature was gradually raised to 100° C. in order that the reaction mixture may be kept stirrable. On completion of the addition of oleum the internal temperature was raised to 150° C. and stirring was continued at that temperature for a further 5 hours. After cooling down to 120° C. 500 g of water were added. The reaction mass dissolved completely within a short time. 650 g were obtained of a 30% strength by weight solution. The SO$_2$ collected as sulfite in a wash bottle amounted to 0.50 mol.

Comparative Example A (according to DE-A-2 659 375)

200 g of the same styrene-indene hydrocarbon resin as in Example 5 and 400 g of carbon tetrachloride were initially charged and heated to 55° C. Then 408.2 g of 98% strength by weight sulfuric acid were added dropwise at 60°–65° C. over 1 hour. The mixture was then stirred at 60°–65° C. for 5 hours and cooled down to room temperature. After neutralization with 1400 g of 25% strength by weight sodium hydroxide solution the two phases were separated. The organic phase (472 g) was discarded, while the aqueous phase (1838 g) was diluted once more with 750 g of water to redissolve the crystalline sediment and adjusted with 146 g of 22% strength by weight sulfuric acid to pH 8–9. 2520 g were obtained of a 22.1% strength by weight solution.

Comparative Example B (according to DE-A-2 659 375)

200 g of the same styrene-indene hydrocarbon resin as in Example 5 and 400 g of carbon tetrachloride were initially charged and heated to 40° C. Then 180 g of chlorosulfonic acid were added dropwise at 40° C. over 2 hours. Then the mixture was subsequently stirred at 60° C. for 1 hour and cooled down to room temperature. After neutralization with 700 g of 9% strength by weight sodium carbonate solution the two phases were separated. The organic phase (421 g) was discarded, while the aqueous phase was further diluted with 500 g of water to redissolve the crystalline sediment and adjusted with 54 g of 50% strength by weight sodium hydroxide solution to pH 7–8. 1495 g were obtained of a 20% strength by weight solution.

Use Examples

The dispersion achieved in the dye preparations was characterized by the centrifugal test of Richter and Vescia, Melliand Textilberichte 1965, 621–625.

The numerical values correspond to the dye content in % which on centrifuging at speeds of 1000, 2000 and 4000 revolutions per minute sediments after 5 minutes (1st to 3rd value) and which remains in the dispersion at the end (4th value). Dye preparations having small sedimentation values and a high final value are particularly finely divided.

Example 8

20 g of the blue disperse dye C.I. number 11365 (calculated dry) in the form of the water-moist press cake were pasted up with 10 g of the dispersant of Example 1, 10 g of sorbitol in the form of a 70% strength by weight aqueous solution, 1 g of a commercial biocide (1,2-benzisothiazolin-3-one in the form of a 9.5% strength by weight solution in propylene glycol) and water to a total weight of 100 g using a high speed mixer and ground in a stirred ball mill with grinding media made of glass to obtain a fine state of division. The pH was 8.5.

The centrifugal test values obtained were as follows: 4/9/24/63.

The dye preparation obtained was liquid and stable and very highly suitable for dyeing polyester fibers and fabrics by any customary dyeing process. Especially in the dyeing of polyester-cotton blend fabrics by the thermosol process, the dye preparation was notable for a high cotton reserve. Dyed packages of textured polyester fibers were completely free of dye deposits.

Example 9

40 g of the red disperse dye C.I. Disperse Red 277 (calculated dry) in the form of the water-moist press cake were adjusted with 60 g of the dispersant of Example 2 and water to a solids content of 40% by weight and ground in a stirred ball mill at a pH of 8.5–9.

The centrifugal test values obtained were as follows: 4/7/14/75.

The dispersion was spray dried at a gas inlet temperature of 120° C. and weakened with 100 g of the dispersant of Example 2 to the final color strength. The powder obtained had the state of fine division achieved in the wet grinding stage.

Stirring into water produced a stable dyeing liquor which was free of any flocculate even under high temperature dyeing conditions and was very highly suitable not only for dyeing packages of textured polyester fibers but also for the thermosol dyeing of polyester-cotton blend fabrics. More particularly, this preparation produced only minimal staining of the cotton fibers. The dye was very readily washed off the cotton.

Example 10

46 g of the dye Vat Green 1 (C.I. 59825) in the form of the water-moist press cake (calculated dry) were adjusted with 30 g of dispersant of Example 2 and water to a solids content of 35% by weight and ground in a stirred ball mill with grinding media made of glass until a state of fine division was achieved. The pH was adjusted with sodium hydroxide solution to 10.5–11.

The centrifugal test values were: 6/11/18/65.

A further 24 g of dispersant were added to weaken to the final color strength before spray drying at a gas inlet temperature of 140° C.

The dye powder obtained exhibited the state of fine division achieved in the wet grinding stage and produced satisfactory dyeings on cotton by any conventional method. The novel formulation is notable in particular for a distinctly higher dispersion stability compared with existing commercial products.

Example 11

36 g of the dye Vat Blue 4 in the form of a water-moist press cake (calculated dry) were ground with 64 g of dispersant of Example 2 and dried, both steps being carried out analogously to Example 10.

Solids content at the time of grinding: 30% by weight pH: 10–10.5 (NaOH)

Centrifugal test: 3/5/20/72

Gas inlet temperature in spray dryer: 120° C.

Properties: as for Example 10

Example 12

40 g of the dye Vat Black 25 in the form of a water-moist press cake (calculated dry) were ground with 60 g of dispersant of Example 2 and dried, both steps being carried out analogously to Example 10.

Solids content at the time of grinding: 25% by weight pH: 10–11 (NaOH)

Centrifugal test: 2/6/9/83

Gas inlet temperature in spray dryer: 130° C.

Properties: as for Example 10

Example 13

Example 8 was repeated with the dispersant of Example 1 replaced by the same amount of the dispersant of Example 3. The sample showed the same properties as in Example 8. The centrifugal test values were 5/8/22/65.

Example 14

Example 8 was repeated with the dispersant of Example 1 replaced by the same amount of the dispersant of Example 4. The sample showed the same properties as in Example 8. The centrifugal test values were 7/11/24/58.

Example 15

Example 8 was repeated with the dispersant of Example 1 replaced by the same amount of the dispersant of Example 5. The sample showed the same properties as in Example 8. The centrifugal test values were 8/10/22/60.

Comparative Example C

Example 8 was repeated with the dispersant of Example 1 replaced by the same amount of the dispersant of the Comparative Example A, affording a highly viscous preparation which was not grindable in a conventional stirred ball mill.

Comparative Example D

Example 8 was repeated with the dispersant of Example 1 replaced by the same amount of the dispersant of the Comparative Example B.

The dispersion obtained was initially liquid and grindable. The centrifugal test values were: 8/12/22/58.

On prolonged standing (6 weeks at room temperature) or after 3 days at 60° C. the viscosity rose strongly, and the fineness dropped off distinctly. The centrifugal test now produced the following values: 70/16/9/5. The preparation also showed poor dispersion stability under dyeing conditions. For instance, dyed packages of textured polyester fibers exhibited considerable dye deposits and unlevelness.

Example 16

A 50:50 polyester-cotton yarn on 700 g packages (package density: 350 g/l) was machine dyed in a liquor ratio of 15:1). The specific flow rate was 30 l/kg-min, with the direction of flow being from in to out for 4 minutes and from out to in for 6 minutes. The dyeing liquor contained 2 g/l of the dye Vat Blue 6 (C.I. number 69825), 2 g/l of a polyacrylate, 0.5 g/l of a complexing agent and 2 g/l of a standard dispersant based on a naphthalenesulfonic acid-formaldehyde condensate. A pH of 4.5 was set with acetic acid (30% by weight).

First the polyester portion was dyed. For this the dyeing liquor was heated over 40 minutes from 60° C. to 130° C. and held at 130° C. for 40 minutes and thereafter cooled down to 60° C. Then the cotton portion was dyed. For this the liquor was admixed with 24 ml/l of NaOH (38° Be) and 5 g/l of hydrosulfite and heated to 60° C. for 40 minutes.

Thereafter the dyebath was rinsed in overflow until the rinse water remained clear. After addition of 2 ml/l of hydrogen peroxide and 0.5 g/l of a standard dispersant based on a naphthalenesulfonic acid-formaldehyde condensate the vat dye was oxidized at 60° C. over 10 minutes. The oxidation liquor was dropped and the goods were rinsed cold until the rinse water was clear.

For soaping the fresh liquor was admixed with 1 g/l of a surfactant mixture, 0.5 g/l of sodium carbonate (calc.) and 0.5 g/l of a standard dispersant based on a naphthalenesulfonic acid-formaldehyde condensate and boiled for 15 minutes. The soaping liquor was discharged, followed by hot and cold rinsing, and the package was removed and dried.

The result obtained was a blue package whose outer surfaces were free of any deposits of dye pigment. The rub fastness properties (dry and wet) after the yarn had been knitted up corresponded to the standard values for this dye.

We claim:

1. A sulfonated and oxidized indene polymer obtained by (a) polymerizing a $C_9$ cut obtained by fractional distillation of products of terminal cracking of a naphthenic residue oil, the $C_9$ cut containing as polymerizable monomers from 10 to 50% by weight of indene or an indene derivative of the general formula (I):

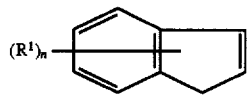

where $R^1$ is hydrogen, methyl or ethyl and n is 1 or 2, and from 10 to 60% by weight of styrene or a styrene derivative of the general formula (II):

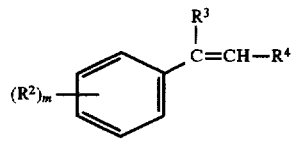

where $R^2$, $R^3$ and $R^4$, are each hydrogen, methyl or ethyl and m is 1 or 2, (b) sulfonating the polymer with 0.3 to 1.7 mol of calculated $SO_3$ per mol of I of a sulfonating agent at a temperature from 40° to 130° C. and (c) non-chain-degrading oxidation of the polymer at a temperature from 80° to 180° C.;

wherein said sulfonated and oxidized indene polymer obtained by sulfonation with sulfuric acid or oleum in steps (b); and (c).

2. The sulfonated and oxidized indene polymer of claim 1, wherein said $SO_3$ in step (b) is present in a calculated amount of 0.5 to 1.3 mol per mol of (I), and wherein said temperature in step (b) is 45° to 120° C., and wherein said temperature in step (c) is from 80° to 165° C.

3. The sulfonated and oxidized indene polymer of claim 1, wherein said temperature in step (b) is 50° to 100° C. and wherein said temperature in step (c) is from 90° to 110° C.

* * * * *